United States Patent
Paz Martinez-Vidamonte et al.

(10) Patent No.: US 12,385,155 B2
(45) Date of Patent: Aug. 12, 2025

(54) METHODS FOR ANODIZING A PART SURFACE AND SUBSEQUENTLY COATING THE ANODIZED PART SURFACE FOR CORROSION PROTECTION PURPOSES

(71) Applicants: Airbus SAS, Blagnac (FR); Airbus Operations GmbH, Hamburg (DE)

(72) Inventors: Mariana Paz Martinez-Vidamonte, Blagnac (FR); Theodor Hack, Blagnac (FR); Malte Burchardt, Hamburg (DE); Martin Beneke, Hamburg (DE)

(73) Assignees: AIRBUS OPERATIONS GMBH, Hamburg (DE); AIRBUS SAS, Blagnac (FR)

( * ) Notice: Subject to any disclaimer, the term of this patent is extended or adjusted under 35 U.S.C. 154(b) by 0 days.

(21) Appl. No.: 18/307,867

(22) Filed: Apr. 27, 2023

(65) Prior Publication Data

US 2024/0167186 A1    May 23, 2024

(30) Foreign Application Priority Data

Apr. 29, 2022   (EP) .................................... 22170800

(51) Int. Cl.
| | |
|---|---|
| *C25D 11/08* | (2006.01) |
| *C09D 5/00* | (2006.01) |
| *C09D 163/00* | (2006.01) |
| *C25D 11/10* | (2006.01) |
| *C25D 11/16* | (2006.01) |

(52) U.S. Cl.
CPC .............. *C25D 11/10* (2013.01); *C09D 5/002* (2013.01); *C09D 163/00* (2013.01); *C25D 11/08* (2013.01); *C25D 11/16* (2013.01)

(58) Field of Classification Search
None
See application file for complete search history.

(56) References Cited

U.S. PATENT DOCUMENTS

| | | |
|---|---|---|
| 2002/0157961 A1 | 10/2002 | Dattilo et al. |
| 2005/0150771 A1 | 7/2005 | Kock et al. |
| 2009/0107848 A1 | 4/2009 | Ocon Esteban et al. |
| 2016/0194779 A1 | 7/2016 | Umemoto et al. |
| 2016/0289858 A1* | 10/2016 | Curran .................. C25D 11/08 |
| 2019/0112725 A1 | 4/2019 | De Kok et al. |
| 2022/0136127 A1 | 5/2022 | Akyil et al. |

FOREIGN PATENT DOCUMENTS

| | | |
|---|---|---|
| CN | 1106865 A | 8/1995 |
| CN | 106757264 A | 5/2017 |
| CN | 110965104 A | 4/2020 |
| DE | 10361888 B3 | 9/2005 |
| EP | 1233084 A2 | 8/2002 |
| EP | 2055810 A2 | 5/2009 |
| EP | 3696299 A1 | 8/2020 |

OTHER PUBLICATIONS

Arts et al. (Electrochimica Acta 55 '2010' 3957-3965). (Year: 2010).*
European Search Report for European Patent Application No. 22170800 dated Oct. 25, 2022; priority document.

* cited by examiner

*Primary Examiner* — Wojciech Haske
(74) *Attorney, Agent, or Firm* — Greer, Burns & Crain, Ltd.

(57) ABSTRACT

To improve adhesion of Cr(VI)-free primers and suitable topcoats on aircraft parts, a method for anodizing part surface of the aircraft part that includes aluminum or an aluminum alloy including the steps of cleaning the part and exposing the part to an anodizing electrolyte. During anodizing it is essential that the temperature of the anodizing electrolyte is maintained at a constant temperature chosen from a range from 42° C. to 60° C.

16 Claims, 6 Drawing Sheets

METHODS FOR ANODIZING A PART SURFACE AND SUBSEQUENTLY COATING THE ANODIZED PART SURFACE FOR CORROSION PROTECTION PURPOSES

CROSS-REFERENCES TO RELATED APPLICATIONS

This application claims the benefit of the European patent application No. 22170800.1 filed on Apr. 29, 2022, the entire disclosures of which are incorporated herein by way of reference.

BACKGROUND OF THE INVENTION

The invention relates to a method for anodizing a part surface of a part, preferably an aircraft part, and a method for coating a part surface. Further the invention relates to a part obtainable by this method and an aircraft equipped with this part.

BACKGROUND OF THE INVENTION

Traditionally aluminum parts in the aerospace industry have been anodized in chromic acid (chromic acid anodization, short: CAA). CAA was both used for corrosion protection of painted structural aluminum parts and as a pre-treatment prior to bonding for parts joined by structural bonding. While the corrosion protection and adhesion properties of anodic oxide films obtained by this process were outstanding, the health hazard of hexavalent chromium led to its substitution.

In the 2000s decade tartaric-sulfuric acid anodizing (TSA) was introduced as a substitution of CAA for corrosion protection purposes (painted parts, unpainted parts). The anodic films produced by the TSA process are usually not suitable for bonding applications. The resulting anodic oxide film of the TSA process is a porous structure with a smooth oxide surface, and with narrow pores. The narrow pores are suitable for sealing steps, providing corrosion protection for unpainted parts. In unsealed condition, the pores provide good adhesion for paint. The TSA process was developed and qualified with conventional, Cr(VI)-loaded basic primers that were available at that time and that are still in use.

For other kinds of paints, such as Cr(VI)-free basic primers that are currently known, an adaption of parameters of the TSA process, aiming at an improved adhesion of the new paints and an improved corrosion protection performance of the full stack, could be key to enable their widespread introduction as a standard.

DE 103 61 888 B3 discloses a method for applying an anodizing layer to the surface of components made of aluminum materials. The workpiece to be treated is introduced successively into two different electrolytes, each consisting of at least two components, and its surface is oxidized while applying a DC voltage. In the first anodizing step, the electrolyte consists of an inorganic mixed acid, while in the second anodizing step a mixture of an organic and an inorganic acid is used.

EP 1 233 084 A2 discloses a process for anodizing a workpiece of aluminum or aluminum alloys in the presence of an aqueous acid solution which contains from 10 g to 200 g sulfuric acid and from 5 to 200 g L(+)-tartaric acid.

EP 2 055 810 A2 and US 2009/0 107 848 A1 disclose a procedure for anodizing aluminum or aluminum alloys in which an aluminum or an aluminum alloy part is submerged an in an aqueous solution at a temperature between 0° C. and 140° C., preferably between 0° C. and 130° C., in which the solution includes sulfuric acid, tartaric acid, and at least one inorganic salt of an element selected between at least one transition metal, a lanthanide element, an actinide, and combinations of them, and applying a controlled potential difference, obtaining layers of aluminum oxide with properties as good as or even better than those obtained through anodizing in traditional chromic acid solutions.

The introduction of Cr(VI)-free paints poses a challenge to enhance the corrosion protection provided by the underlying anodic oxide film and to better understand the interaction between the anodic oxide film and the corrosion inhibiting paint.

SUMMARY OF THE INVENTION

It is an object of the invention to allow for an improved corrosion protection with Cr(VI)-free paints.

The invention provides a method for anodizing a part surface of a part, preferably an aircraft part, the surface including aluminum or an aluminum alloy, the method comprising:
a) cleaning the part surface to obtain a cleaned part surface;
b) preparing an anodizing electrolyte, the anodizing electrolyte being chosen from a group consisting of sulfuric acid, and a mixture of sulfuric and tartaric acid; and
c) exposing the cleaned part surface to the anodizing electrolyte and applying an anodizing voltage so as to form an anodized layer on the part surface, wherein, at least when the anodizing voltage is applied, the anodizing electrolyte is maintained at a constant temperature chosen from a range from 42° C. to 60° C.

Preferably, in step c) the temperature is chosen from a range from 43° C. to 47° C. or from 52° C. to 57° C. Preferably, in step c) the temperature is chosen from a range from (45±1) ° C. or from (55±1) ° C.

Preferably, in step b) the anodizing electrolyte is sulfuric acid. Preferably, the sulfuric acid has a concentration of 30 g/l to 50 g/l. Preferably, the sulfuric acid has a concentration of 36 g/l to 44 g/l. Preferably, the sulfuric acid has a concentration of 38 g/l to 42 g/l, more preferably (40±1) g/l.

Preferably, in step b) the anodizing electrolyte is the mixture of sulfuric acid and tartaric acid. Preferably, the sulfuric acid has a concentration of 30 g/l to 130 g/l. Preferably, the sulfuric acid has a concentration of 36 g/l to 44 g/l. Preferably, the sulfuric acid has a concentration of 38 g/l to 42 g/l. Preferably, the sulfuric acid has a concentration of (40±1) g/l.

Preferably, the tartaric acid has a concentration of 40 g/l to 100 g/l. Preferably, the tartaric acid has a concentration of 70 g/l to 90 g/l. Preferably, the tartaric acid has a concentration of 78 g/l to 82 g/l. Preferably, the tartaric acid has a concentration of (80±1) g/l.

Preferably, in step b) the anodizing electrolyte is the mixture of sulfuric acid and tartaric acid. Preferably, the sulfuric acid has a concentration of 30 g/l to 130 g/l. Preferably, the sulfuric acid has a concentration of 36 g/l to 44 g/l. Preferably, the sulfuric acid has a concentration of 38 g/l to 42 g/l. Preferably, the sulfuric acid has a concentration of (40±1) g/l. Preferably, the tartaric acid has a concentration of 130 g/l to 170 g/l. Preferably, the tartaric acid has a concentration of 140 g/l to 160 g/l. Preferably, the tartaric acid has a concentration of 145 g/l to 155 g/l. Preferably, the tartaric acid has a concentration of (150±1) g/l.

Preferably, in step c) the anodizing voltage is ramped up to a value of 10 V to 25 V in a time period of 0.5 min to 2 min and kept constant for a time period of 8 min to 12 min.

Preferably, the anodizing voltage is ramped up to a value of 12 V to 14 V, preferably to a value of 14 V, more preferably to a value of 14.0 V. Preferably, the anodizing voltage is kept constant for a time period of 8 min to 10 min, preferably for a time period of 8.0 min to 10.0 min, more preferably for a time period of 8.0 min or of 10.0 min.

Preferably, step a) comprises a1) degreasing the part surface to obtain a degreased part surface.

Preferably, step a) comprises a2) alkaline etching of the degreased part surface to obtain an etched part surface.

Preferably, step a) comprises a3) pickling the etched part surface with an acidic pickling solution.

Preferably, step a) comprises a4) rinsing the part surface between any of the steps a1) to a3) and/or after step a3).

The invention provides a method for coating a part surface of a part, preferably an aircraft part, with a corrosion protection layer, the method comprising:
a) performing a previously described method so as to obtain an anodized layer;
b) applying a primer layer made of Cr(VI)-free epoxy model primer on the anodized layer; and optionally
c) applying a topcoat layer made of a compatible epoxy topcoat.

The invention provides a part, preferably an aircraft part obtainable by a preferred method, and an aircraft comprising the aircraft part.

The invention relates to surface engineering, in particular to the field of corrosion protection of structural aerospace aluminum alloys. The ideas described herein can be generally applied to all aluminum parts that require a surface treatment for corrosion protection (e.g., all parts that are currently anodized for corrosion protection purposes) It should be noted that these ideas are not necessarily applicable to parts anodized for bonding purposes.

Experiments of the inventors surprisingly found that there exists a range of temperatures in which a specific surface morphology is obtained, which enhances adhesion. This range of temperatures is dependent on the anodizing electrolyte chemical composition.

Furthermore, samples anodized in this particular range of temperatures and subsequently painted with a corrosion inhibiting paint show better corrosion protection performance in standard corrosion testing (neutral salt spray test, filiform corrosion test). This is the case, even when the corrosion resistance of the bare (not-painted) samples anodized in this particular range of temperatures was lower than that of the reference process.

This process allows for the enhancement of paint adhesion and corrosion protection performance. The new TSA process may serve as an enabler for new paint schemes such as Cr(VI)-free basic primers. Furthermore, these ideas may enable the introduction of innovative coating solutions beyond conventional paints (e.g., powder coatings, bio-based coatings). An improved corrosion protection performances reduces the need for maintenance and repairs associated with corrosion processes of anodized and painted aluminum parts.

A characteristic oxide morphology at the ultimate surface of the anodic oxide film is obtained at those temperatures. Widening of the pore mouths and the creation of a rougher surface is observed.

The samples with an anodic oxide film with the above mentioned morphological features in combination with a corrosion inhibiting paint outperform all the other samples, including the reference sample prepared according to the standard TSA process. All the other samples tested were anodized at 37° C. and did not show this distinct surface morphology.

DETAILED DESCRIPTION OF THE PREFERRED EMBODIMENTS

Figure 1A:
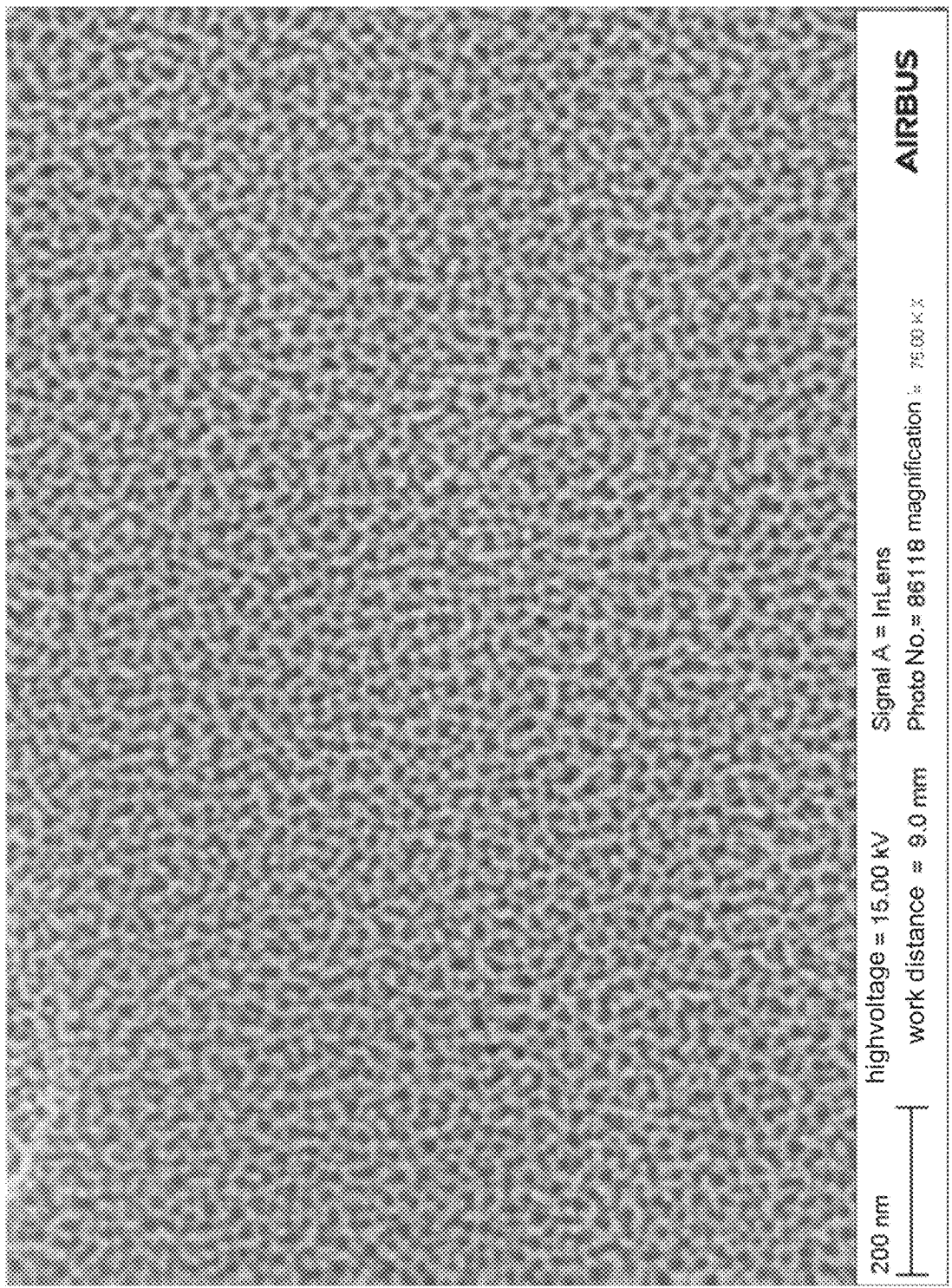
FIGS. 1A to 1C depict a surface morphology obtained by processes according to the invention.

Example 1—FIG. 1A

An aircraft part, such as a structural part, that is preferably made of AA2024 alloy and cladded with a commercially pure aluminum grade, is pretreated by degreasing in an alkaline cleaner for 15 minutes at 60° C. Subsequently, alkaline etching for 1 minute at 60° C. was performed. Finally, the panels have been desmutted in a fluoride containing acidic pickling solution for 5 minutes at 35° C. Between each of these pre-treatment steps (degreasing, etching and pickling), the part has been rinsed in agitated deionized water at room temperature for three minutes.

Sulfuric acid with a concentration of 40 g/l is prepared as an anodizing electrolyte. The anodizing electrolyte is maintained at a temperature of 45° C.

The part is exposed to the anodizing electrolyte. An anodizing voltage is ramped up to 14 V over a time period of 1 minute and kept at 14 V for a time period of 10 minutes.

Figure 1B:
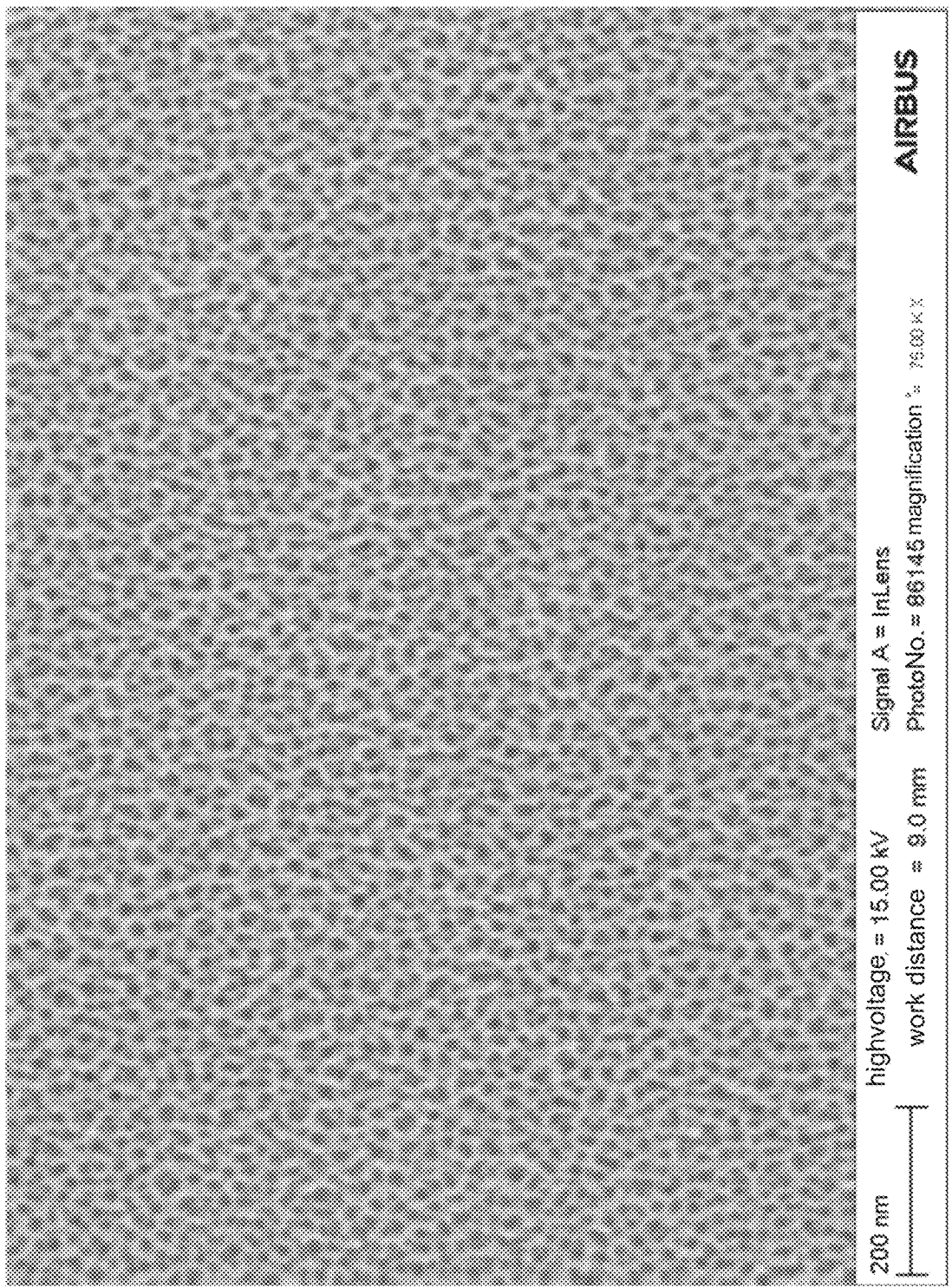
Figure 1C:
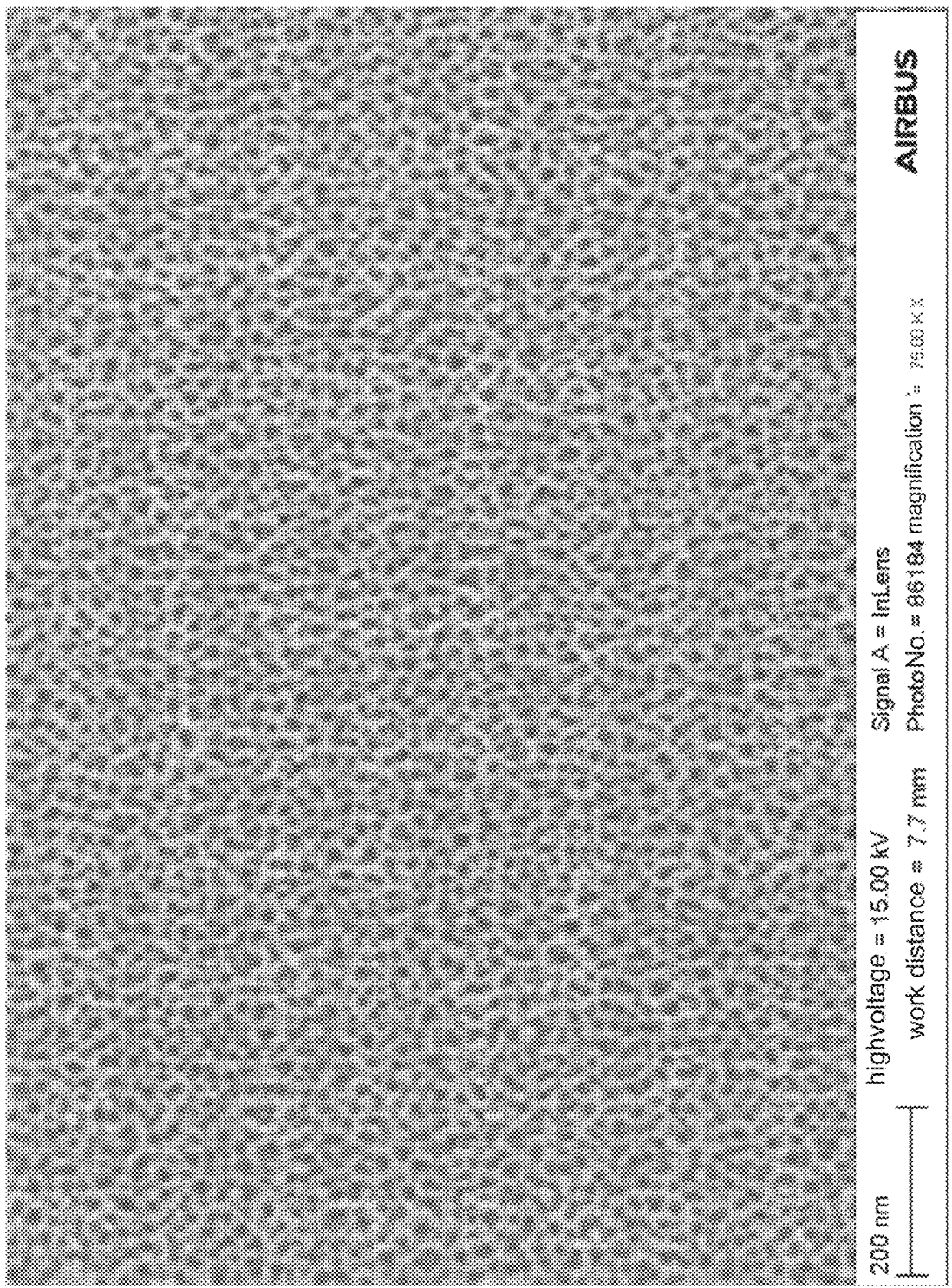
Figure 1D:
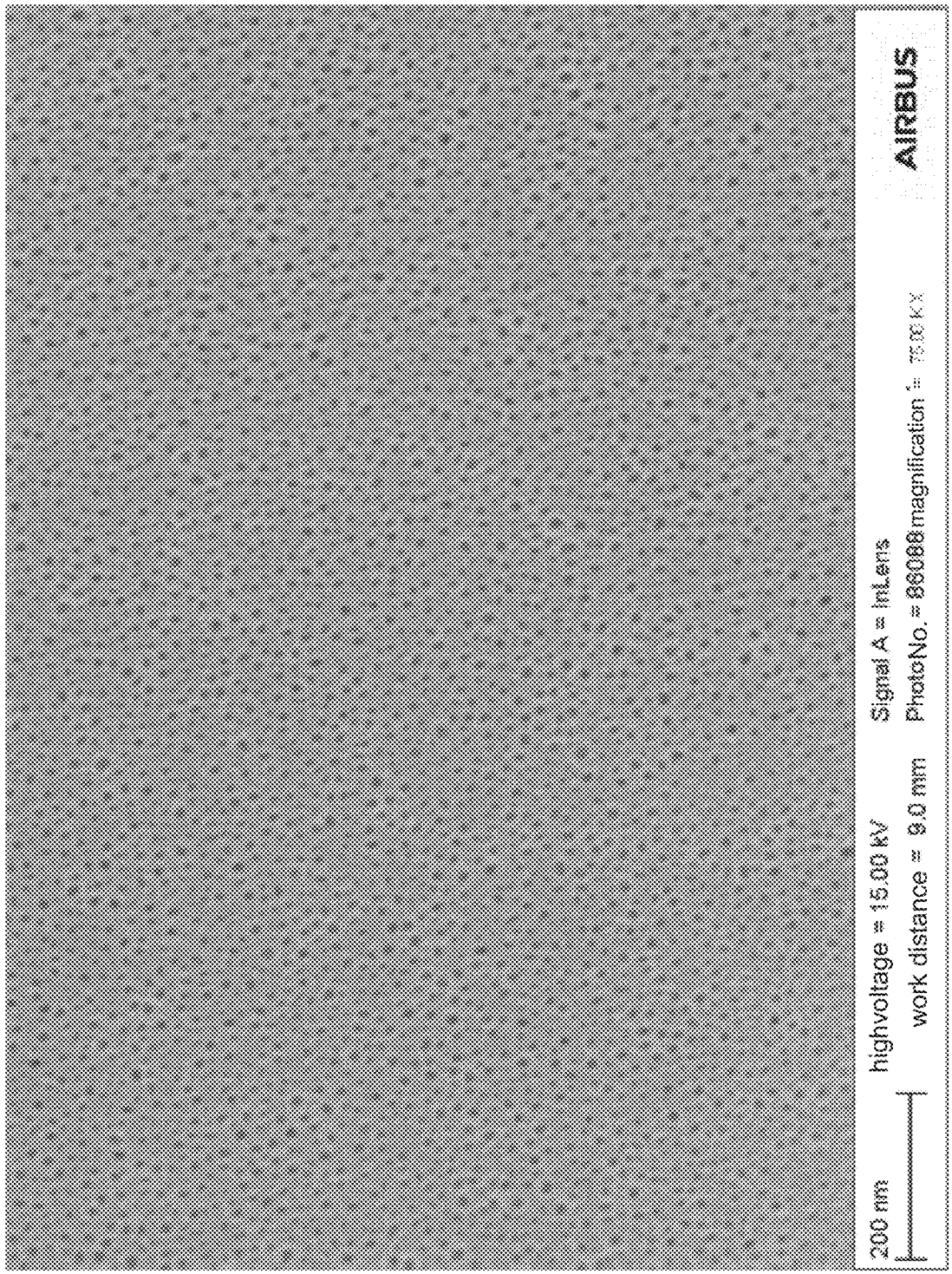
FIGS. 1D to 1F depict a surface morphology obtained by a process according to the comparative examples.

Comparative Example 1—FIG. 1D

The process according to Example 1 is repeated with the anodizing electrolyte being maintained at a temperature of 37° C.

The part is exposed to the anodizing electrolyte. The anodizing voltage is ramped up to 20 V over a time period of 1 minute and kept at 20 V for a time period of 8 minutes.

Example 2—FIG. 1B

The process according to Example 1 is repeated with the anodizing electrolyte being prepared from a mixture of sulfuric acid with a concentration of 40 g/l and tartaric acid with a concentration of 80 g/l. The anodizing electrolyte is maintained at a temperature of 55° C.

The part is exposed to the anodizing electrolyte. The anodizing voltage is ramped up to 14 V over a time period of 1 minute and kept at 14 V for a time period of 8 minutes.

Figure 1E:
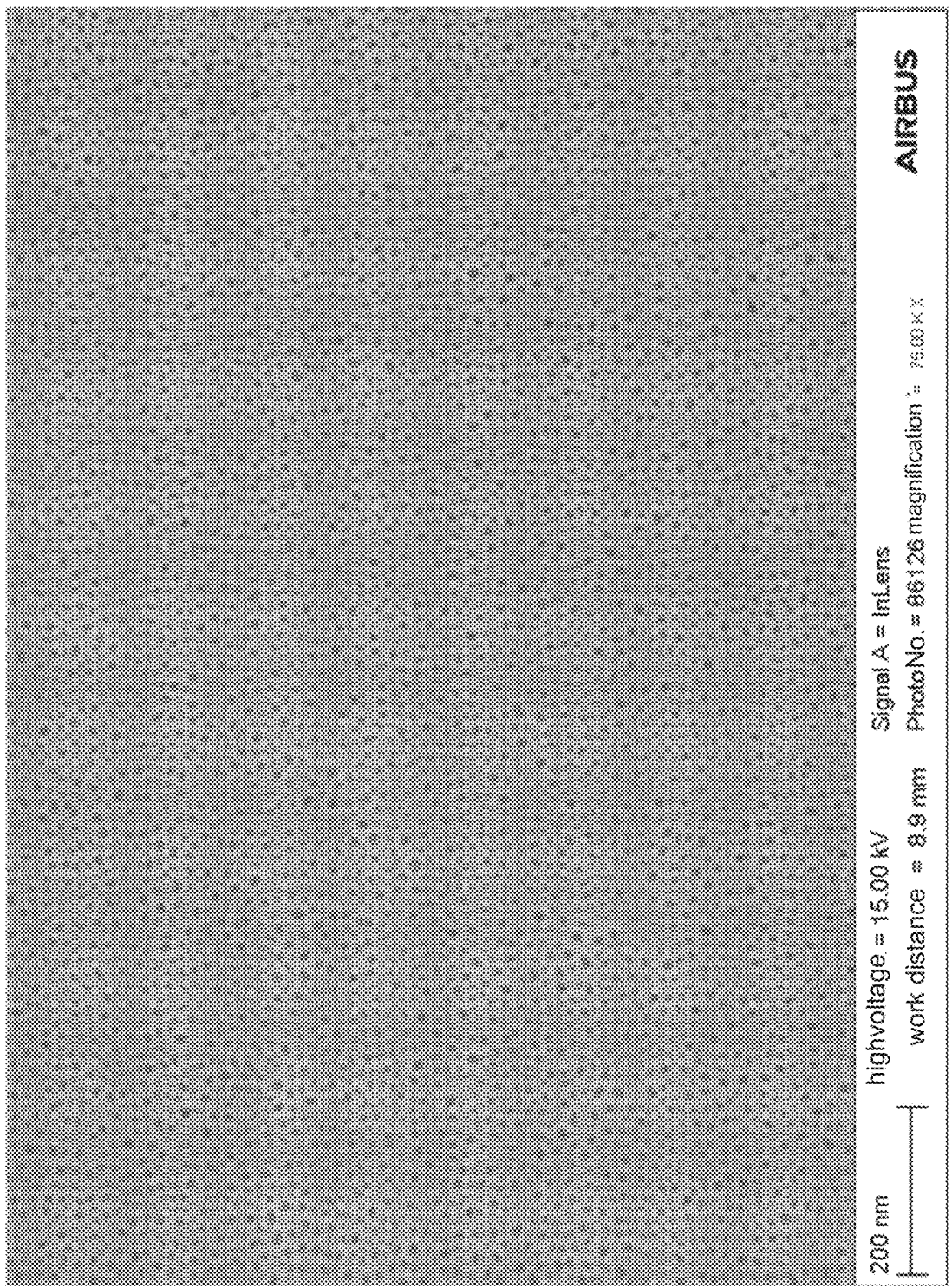

Comparative Example 2—FIG. 1E

The process according to Example 2 is repeated with the anodizing electrolyte being maintained at a temperature of 37° C.

The part is exposed to the anodizing electrolyte. The anodizing voltage is ramped up to 20 V over a time period of 1 minute and kept at 20 V for a time period of 9 minutes.

Example 3—FIG. 1C

The process according to Example 1 is repeated with the anodizing electrolyte being prepared from a mixture of sulfuric acid with a concentration of 40 g/l and tartaric acid with a concentration of 150 g/l. The anodizing electrolyte is maintained at a temperature of 55° C.

The part is exposed to the anodizing electrolyte. The anodizing voltage is ramped up to 14 V over a time period of 1 minute and kept at 14 V for a time period of 10 minutes.

Figure 1F:
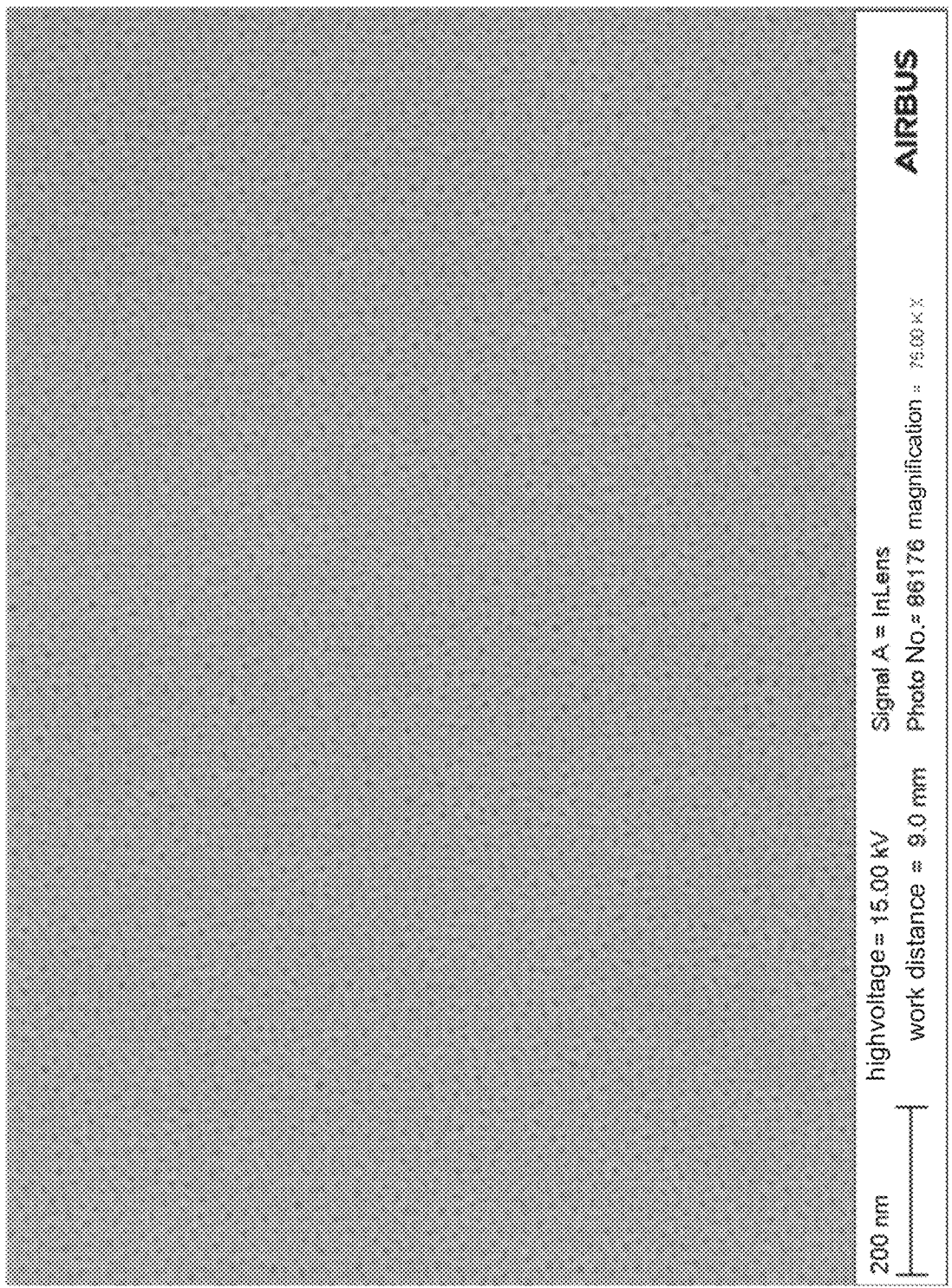

Comparative Example 3 FIG. 1F

The process according to Example 3 is repeated with the anodizing electrolyte being maintained at a temperature of 37° C.

The part is exposed to the anodizing electrolyte. The anodizing voltage is ramped up to 20 V over a time period of 1 minute and kept at 20 V for a time period of 10 minutes.

Cr(VI)-Free Coating of the Anodized Part

The anodized part surface is coated with an organic coating. A Cr(VI)-free inhibited solvent-based epoxy model primer was applied to the samples by spraying targeting a coating thickness of 20 µm (±5 µm). A compatible epoxy topcoat layer was applied on the panels intended for the filiform corrosion (FFT) experiment on top of the model primer, targeting a coating thickness of 25 µm (±5 µm).

Corrosion Testing: Neutral Salt Spray (NSST)

To study corrosion in the presence of a physical defect, coated parts have been artificially damaged using two crossing u-shaped scribes forming an X on the surface. The scribes are 1 mm wide and have a depth between 200 µm and 300 µm, ensuring that the damage penetrates through the paint, oxide and cladding, thus reaching the substrate alloy. This procedure is defined in the ISO 17872 standard. The scribes have been created by a rotating saw.

Shortly after scribing, the panels have been transferred to a neutral salt spray test chamber according to ISO 9227 for 3000 hours. A visual inspection was carried out after 168 h, 336 h, 500 h, 1000 h, 2000 h and 3000 h. In this inspection, attention is given to changes in the scribe color (tarnishing), the appearance of pits, the presence of corrosion products, paint discoloration and the length of the paint creepage, which is measured starting from the artificial defect.

The subsequent Table 1 shows the average (over three samples) of the maximum paint creepage after 3000 hours in a neutral salt spray test. As a general trend, the best results (smaller paint creepage length) are obtained for the samples anodized according to the invention at temperatures above 42° C. SAA designates regular concentration sulfuric acid anodization, TSA and T+SA designate tartaric and sulfuric acid anodization, wherein the "+" designates a concentration of tartaric acid of 150 g/l.

TABLE 1

| Exposure time [h] | Paint creepage | Anodizing parameters | | | | | |
|---|---|---|---|---|---|---|---|
| | | SAA 14 V 45° C. | SAA 20 V 37° C. | TSA 14 V 55° C. | TSA 20 V 37° C. | T+SA 14 V 55° C. | T+SA 20 V 37° C. |
| 3000 h | Length [mm] | 1.5 | 2.4 | 1.7 | 3.1 | 1.8 | 4.2 |
| | SD [mm] | 0.1 | 0.6 | 0.6 | 0.8 | 0.5 | 0.4 |

Corrosion Testing: Filiform Corrosion (FFT)

The ability of the corrosion protection scheme (anodic oxide film+primer+topcoat) to prevent filiform corrosion has been studied according to the EN3665 standard. For this purpose, samples have been scribed according to ISO 17872, in the same way as for the NSST samples.

Shortly after scribing, the panels were pre-exposed to hydrochloric acid vapor for one hour. The samples were then transferred to a cabinet at 40° C. and 82% relative humidity for 1000 hours. Visual inspections were carried out after 168 h, 336 h, 500 h, 750 h and 1000 h. In each of these inspections, the lengths of the 5 longest filaments were noted. After the test, some selected specimens have been automatically assessed by a Schäfter+Kirchhoff corrosion inspector scanner and the associated automatic image processing software to further increase the statistical relevance of the obtained results.

The filiform corrosion test is typically assessed by measuring the five longest filaments per sample, and averaging the results. The results obtained by this principle, considering three samples per anodizing condition, at the different inspection times during the 1000 h filiform corrosion test are shown in subsequent Table 2. These results show similar filament lengths for all test panels, regardless of the anodizing process parameters used.

However, while the filament length is similar, the appearance of the filaments is dependent on the anodizing parameters, particularly on the anodizing temperature. The filaments are significantly thinner for those samples anodized according to the invention. To better quantify this observation the average filament area has been measured using an FFT scanner coupled with automated image processing software. The results obtained, summarized in the last two rows in Table 2, confirm the qualitative observation, showing smaller average filiform areas for those substrates anodized at elevated temperatures (45° C. or 55° C.).

TABLE 2

| Exposure time [h] | Filament | Anodizing parameters | | | | | |
|---|---|---|---|---|---|---|---|
| | | SAA 14 V 45° C. | SAA 20 V 37° C. | TSA 14 V 55° C. | TSA 20 V 37° C. | T+SA 14 V 55° C. | T+SA 20 V 37° C. |
| 168 | Length [mm] | 0.6 | 0.8 | 0.6 | 0.7 | 0.7 | 0.7 |
| | SD [mm] | 0.1 | 0.1 | 0.1 | 0.2 | 0.2 | 0.2 |
| 336 | Length [mm] | 1.0 | 1.0 | 1.0 | 1.0 | 1.1 | 1.0 |
| | SD [mm] | 0.1 | 0.2 | 0.2 | 0.1 | 0.2 | 0.1 |
| 500 | Length [mm] | 1.0 | 1.1 | 1.0 | 1.1 | 1.2 | 1.1 |
| | SD [mm] | 0.1 | 0.2 | 0.2 | 0.1 | 0.2 | 0.2 |
| 750 | Length [mm] | 1.2 | 1.2 | 1.2 | 1.1 | 1.4 | 1.3 |
| | SD [mm] | 0.3 | 0.3 | 0.2 | 0.1 | 0.3 | 0.2 |
| 1000 | Length [mm] | 1.4 | 1.3 | 1.3 | 1.4 | 1.5 | 1.3 |
| | SD [mm] | 0.2 | 0.3 | 0.2 | 0.1 | 0.3 | 0.2 |
| | Area [mm$^2$] | 4.8 | 5.6 | 3.9 | 5.7 | 5.2 | 6.5 |
| | SD [mm$^2$] | 0.8 | 1.0 | 0.9 | 1.3 | 1.2 | 1.7 |

Adhesion Testing: Cross-Cut Test

Adhesion performance was assessed using ISO 2409 standard for the cross-cut adhesion between a substrate and organic coating. First, the thickness of the coating was measured by eddy current. Then, six parallel cuts, at a distance of 1 mm from each other are performed in two perpendicular directions forming a lattice. In this particular case, the cuts have been done by a motor-driven single blade at a constant force. The force applied was chosen to ensure complete penetration of the cutting blade through the organic coating. The lattice area is softly cleaned with a brush to remove any coating debris and a pressure sensitive tape (TESA 4651) is applied covering the lattice (test area). The tape is rapidly removed and the visual appearance of the test area is assessed according to the grading system described in the ISO 2409 standard. In order to assess the adhesion stability of the coating in the presence of moisture, the test has been conducted on dry samples, as well as on samples that were immersed in deionized water for two weeks.

A cross-cut adhesion test (ISO 2409) has been conducted to assess the adhesion properties of the anodic oxide films under study in combination with a Cr(VI)-free model primer in dry conditions and after two weeks of immersion in de-ionized water. All samples show good adhesion (see subsequent Table 3), with no failure at all or only small delamination (<5% of the total area of study) at the cutting intersections. This is the case regardless of the anodizing electrolyte used. These results indicate that, even though the cross cut adhesion test is widely used for the assessment of coating adhesion, it is not sensitive enough to capture the differences in adhesion properties among anodic oxide films.

TABLE 3

| Anodizing Parameters | Dry Adhesion | Wet Adhesion |
|---|---|---|
| SAA 14 V 45° C. | No failure | No failure |
| SAA 20 V 37° C. | No failure | No failure |
| TSA 14 V 55° C. | No failure | No failure |
| TSA 20 V 37° C. | No failure | Delamination <5% of area |
| T+SA 14 V 55° C. | No failure | No failure |
| T+SA 20 V 37° C. | No failure | Delamination <5% of area |

Technical Effects

The morphological characterization of the oxide films reveals an important influence of the electrolyte temperature in terms of porosity and ultimate surface roughness. The higher anodizing temperatures according to the invention lead to an enhanced oxide dissolution, especially in the uppermost area of the oxide, which is in contact with the anodizing electrolyte for the entire anodizing time. As a consequence, the pore mouths are wider and even coalesce and at the same time the ultimate surface becomes rougher, in comparison to the narrow-pores and smooth surfaces seen on the oxides formed at a lower temperature according to the Comparative Examples 1 to 3.

To a lesser extent, the electrolyte chemistry has also an effect on the porosity of the resulting oxide films, with SAA films showing higher porosity values at the surface of the anodic oxide. It has been previously reported that the addition of tartaric acid to a sulfuric acid electrolyte leads to a reduction of the dissolution reaction rate. Hence pore mouth widening through oxide dissolution is less significant in tartaric acid containing electrolytes. Finally, even though the formation voltage did not have a significant impact in the morphological analysis and as previously studied by the inventors, it is widely accepted that the barrier layer thickness is proportional to the formation voltage. Therefore, even though the barrier layer thickness has not been directly characterized in our study, it can be assumed that the barrier layer of the anodic oxide films formed at 20 V is thicker than for the oxides formed at 14 V.

In terms of oxide chemistry, no significant differences could be measured, neither by XPS nor by ToF-SIMS, regardless of the electrolyte chemistry, the formation voltage and the anodizing temperature. In particular, no evidence of tartrate incorporation could be found.

Chronoamperometry investigations revealed that the resistance to pitting behavior of anodic oxide films formed in a tartaric-acid containing electrolyte is better than for SAA oxides. This is derived from the fact that the time under galvanic stress until a significant rise in current density takes place is longer for TSA and T+SA oxides. This is in line with known art, where anodic oxide films formed in chromic acid, sulfuric acid and in several mixed sulfuric acid-organic acid electrolytes, among them tartaric acid, were compared. Furthermore, the present invention demonstrates that aside from the type of electrolyte, the pitting behavior is also affected by the tartaric acid concentration the electrolyte temperature and the anodizing voltage. In fact, increasing the concentration of tartaric acid may substantially increase the time to pitting, while anodizing at a lower temperature (37 vs. 55° C.) and at a higher voltage (20 vs. 14 V) may slightly improve the pitting resistance of the resulting oxides.

The addition of tartaric acid to the anodizing electrolyte also has a positive effect on the resistance of the anodic oxide film against dissolution, especially in the acidified corrosive solution and to a certain extent also in an alkaline environment. However, there is no clear trend correlating the electrolyte temperature and formation voltage with the resistance in the alkaline and acid corrosive solution.

Taking into account the almost identical oxide chemical composition for all studied conditions, the differences in pitting susceptibility and pH stability among bare anodic oxide films is attributed to their morphology.

The reduced porosity of TSA/T+SA oxide films is certainly contributing to its corrosion resistance, whereas the enhanced barrier properties due to a thicker barrier layer could be responsible for the trend of improved pitting resistance at higher formation voltages.

Although the resistance of the bare anodic oxide films provides a way of comparison between the different processes and may be relevant in a few particular applications, in practice anodic oxide films are typically covered by an organic coating loaded with corrosion inhibitors. Therefore, standard corrosion and adhesion tests of anodized and coated specimens have been performed.

In spite of the thicker barrier layer associated with a higher anodizing voltage and the higher pitting corrosion and acidic resistance reported in the present study for TSA and T+SA bare oxides, the corrosion test results show better performance of the coated specimens that underwent higher-temperature anodizing processes (45 and 55° C.) according to the invention, regardless of the electrolyte chemistry and formation voltage. The wider pore mouths and rougher surface of the oxide films anodized at an elevated temperature promote mechanical interlocking and consequently adhesion. Therefore, it can be concluded that the enhanced stability at the coating/oxide interface plays a critical role in the NSST and FFT results.

The effect of the electrolyte chemistry, the electrolyte temperature and the formation voltage on the resulting anodic oxide morphology and chemistry has been studied. The addition of tartaric acid to a sulfuric acid electrolyte leads to a slight reduction in porosity. Wider pore mouths and dissolution driven roughness are the result of anodizing at elevated temperatures while the effect of the formation voltage on the characterized morphological features is not significant. The chemical composition of the surface of the anodic oxide films is almost identical regardless of anodizing parameters.

The resistance to pitting corrosion and the oxide degradation behavior of bare anodic oxide films have been studied as a function of anodizing parameters. The enhanced resistance against pitting corrosion and against degradation in acidic solutions of the bare oxides formed in the presence of tartaric acid highlight the benefits of mixed sulfuric-tartaric acid electrolyte anodizing processes. Although the anodizing temperature and formation voltage play a minor role in comparison to the tartaric acid concentration, a tendency towards better pitting resistance is observed if anodized at lower electrolyte temperatures and higher voltages.

Finally, in combination with a corrosion inhibiting organic coating, the corrosion protection performance is dominated by the anodizing electrolyte temperature that creates optimal morphological features for enhanced coating adhesion, whereas the effect of the anodizing voltage and of the anodizing electrolyte is concealed by the effect of temperature.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for anodizing a part surface of a part, the surface including aluminum or an aluminum alloy, the method comprising:
   a) cleaning the part surface to obtain a cleaned un-anodized part surface;
   b) preparing an anodizing electrolyte, wherein the anodizing electrolyte being chosen from a group consisting of an anodizing electrolyte consisting of sulfuric acid and an anodizing electrolyte containing a mixture of sulfuric and tartaric acid; and
   c) exposing the cleaned part surface to the anodizing electrolyte and applying an anodizing voltage so as to form an anodized layer on the part surface,
   wherein, at least when the anodizing voltage is applied, the anodizing electrolyte consisting of sulfuric acid is maintained at a constant temperature chosen from a range from 42° C. to 47° C., or
   wherein, at least when the anodizing voltage is applied, the anodizing electrolyte containing a mixture of sulfuric acid and tartaric acid is maintained at a constant temperature chosen from a range from 52° C. to 60° C.,
   wherein in step b) the anodizing electrolyte is sulfuric acid having a concentration of 30 g/l to 50 g/l.

2. The method according to claim 1, wherein the sulfuric acid concentration is in the range of (40±1) g/l.

3. A method for anodizing a part surface of a part, the surface including aluminum or an aluminum alloy, the method comprising:
- a) cleaning the part surface to obtain a cleaned unanodized part surface;
- b) preparing an anodizing electrolyte, wherein the anodizing electrolyte contains a mixture of sulfuric and tartaric acid; and
- c) exposing the cleaned part surface to the anodizing electrolyte and applying an anodizing voltage so as to form an anodized layer on the part surface, wherein, at least when the anodizing voltage is applied, the anodizing electrolyte containing a mixture of sulfuric acid and tartaric acid is maintained at a constant temperature chosen from a range from 52° C. to 60° C., wherein in step b) the anodizing electrolyte is the mixture of sulfuric acid and tartaric acid, and the sulfuric acid has a concentration of 30 g/l to 130 g/l and the tartaric acid has a concentration of 40 g/l to 170 g/l.

4. The method according to claim 3, wherein the sulfuric acid concentration is in the range of 36 g/l to 44 g/l.

5. The method according to claim 3, wherein the tartaric acid concentration is in the range of 70 g/l to 90 g/l.

6. The method according to claim 3, wherein the concentration of the tartaric acid has a concentration of 130 g/l to 170 g/l.

7. The method according to claim 6, wherein the sulfuric acid concentration is in the range of 36 g/l to 44 g/l.

8. The method according to claim 6, wherein the tartaric acid concentration is in the range of 140 g/l to 160 g/l.

9. A method for anodizing a part surface of a part, the surface including aluminum or an aluminum alloy, the method comprising:
- a) cleaning the part surface to obtain a cleaned unanodized part surface;
- b) preparing an anodizing electrolyte, wherein the anodizing electrolyte contains a mixture of sulfuric and tartaric acid; and
- c) exposing the cleaned part surface to the anodizing electrolyte and applying an anodizing voltage so as to form an anodized layer on the part surface, wherein, at least when the anodizing voltage is applied, the anodizing electrolyte containing a mixture of sulfuric acid and tartaric acid is maintained at a constant temperature chosen from a range from 52° C. to 57° C.

10. The method according to claim 9, wherein in step c) the anodizing voltage is ramped up to a value of 10 V to 25 V in a time period of 0.5 min to 2 min and kept constant for a time period of 8 min to 12 min.

11. The method according to claim 10, wherein the anodizing voltage is ramped up to a value of 12 V to 14 V.

12. The method according to claim 10, wherein the anodizing voltage is kept constant for a time period of 8 min to 10 min.

13. The method according to claim 9, wherein step a) comprises at least one of:
- a1) degreasing the part surface to obtain a degreased part surface; or
- a2) alkaline etching of the degreased part surface to obtain an etched part surface; or
- a3) pickling the etched part surface with an acidic pickling solution; or
- a4) rinsing the part surface between any of the steps a1) to a3) or after step a3).

14. The method according to claim 9, wherein the part comprises an aircraft part.

15. A method for coating a part surface of a part with a corrosion protection layer, the method comprising:
- a) performing a method according to claim 1 so as to obtain an anodized layer;
- b) applying a primer layer made of Cr(VI)-free epoxy model primer on the anodized layer; and optionally
- c) applying a topcoat layer made of a compatible epoxy topcoat.

16. The method according to claim 15, wherein the part comprises an aircraft part.

\* \* \* \* \*